Figure 1:
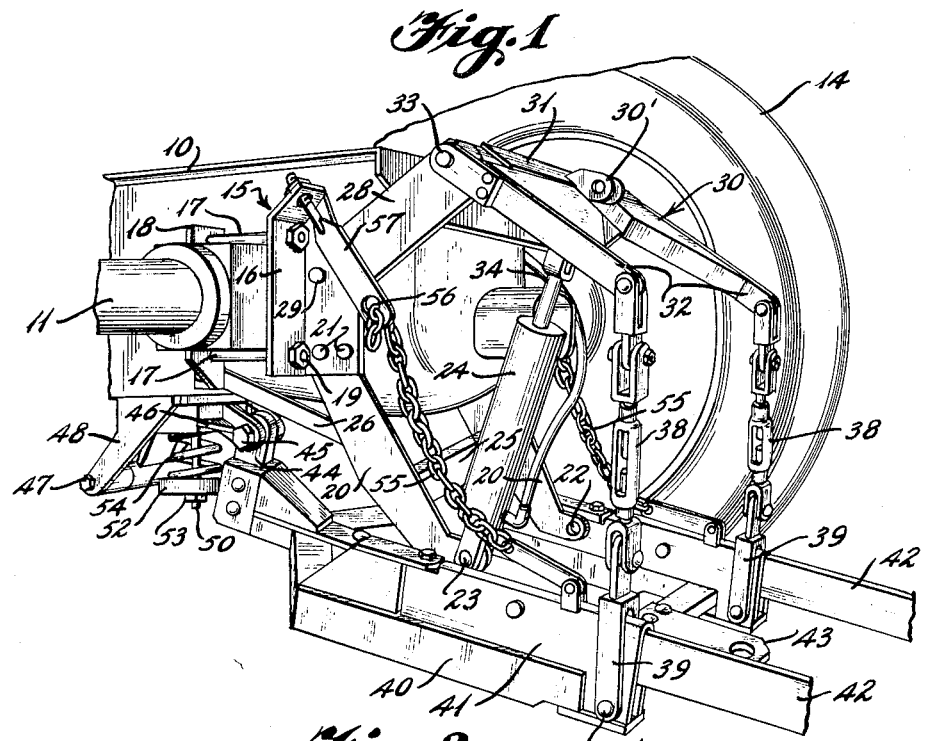

March 29, 1966  P. D. ABBOTT  3,242,993
MECHANICAL TRACTION ADJUSTER FOR FARM VEHICLES
Filed Aug. 21, 1964  3 Sheets-Sheet 1

INVENTOR
Paul D. Abbott
BY
ATTORNEY

March 29, 1966 P. D. ABBOTT 3,242,993
MECHANICAL TRACTION ADJUSTER FOR FARM VEHICLES
Filed Aug. 21, 1964 3 Sheets-Sheet 2

INVENTOR
Paul D. Abbott

BY
ATTORNEY

March 29, 1966  P. D. ABBOTT  3,242,993
MECHANICAL TRACTION ADJUSTER FOR FARM VEHICLES
Filed Aug. 21, 1964  3 Sheets-Sheet 3
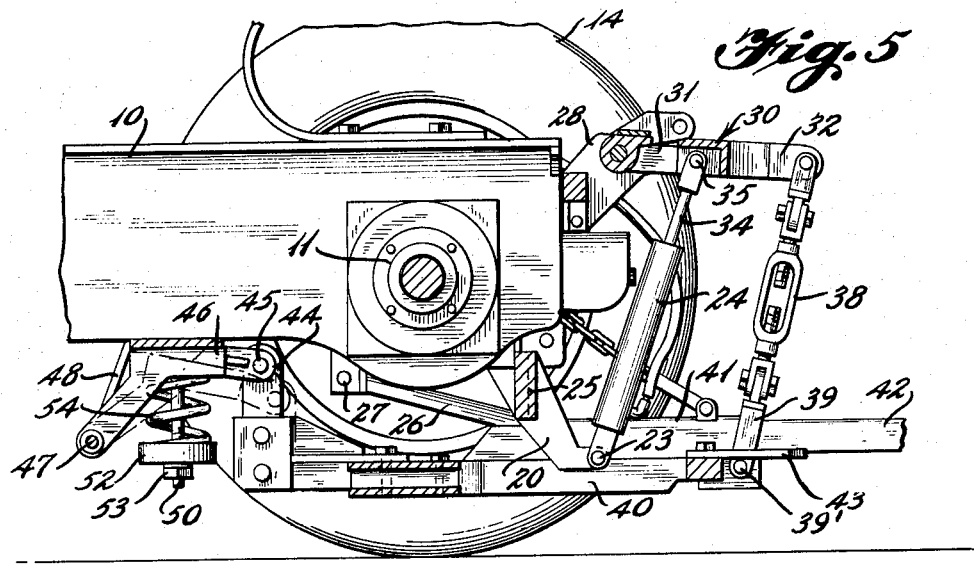
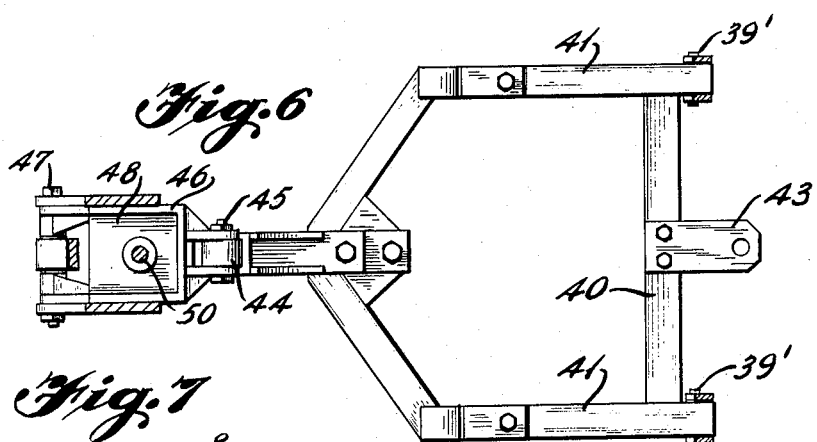
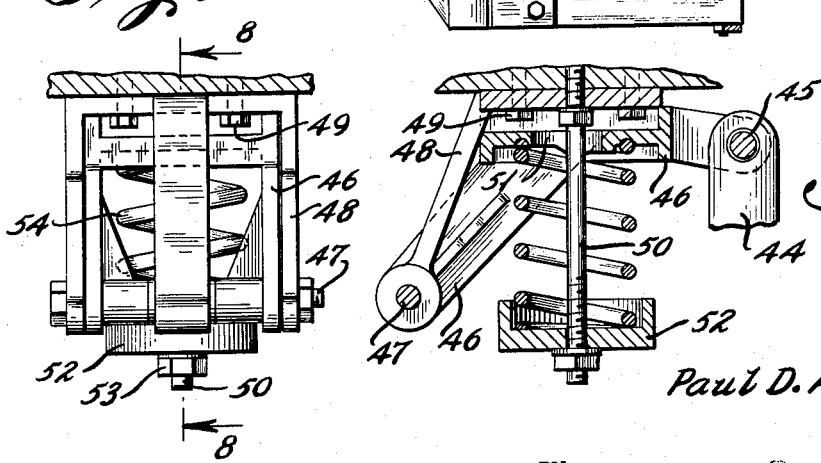
INVENTOR
Paul D. Abbott
BY
ATTORNEY

United States Patent Office 3,242,993
Patented Mar. 29, 1966

3,242,993
MECHANICAL TRACTION ADJUSTER FOR FARM VEHICLES
Paul D. Abbott, P.O. Box 187, Blytheville, Ark.
Filed Aug. 21, 1964, Ser. No. 391,251
4 Claims. (Cl. 172—239)

This invention relates to apparatus and equipment employed in agriculture, including vehicles and implements, and to mechanism for applying traction to the drive wheels of a vehicle in addition to that ordinarily utilized.

The invention relates particularly to a mechanical traction adjuster for supplying increased traction to the drive wheels of a propelling vehicle when additional traction is required by an earth-working implement connected to such vehicle.

Heretofore tractors or other vehicles utilized for the propelling of earth-working implements across a field or other area where the surface is relatively soft have had a tendency to slip and spin the drive wheels of the vehicle when a greater strain than ordinary has been applied to the implement, and as a result most connections between the vehicle and the implement have been of the breakaway type, usually having a shear pin which would fracture and release the implement in order not to damage the same. Some efforts have been made to transfer additional traction to the wheels of the vehicle to overcome the additional strain or load requirement and to prevent the spinning of the wheels. Most of these prior efforts have relied upon the hydraulic system of the vehicle to apply the additional weight and traction necessary to overcome the strain on the implement and have not been entirely satisfactory due to the fact that there has been a short delay between the time that a strain is placed on the implement and the additional traction is applied to the drive wheels of the vehicle. Because of the short delay, the drive wheels have started to spin and in most cases have rotated at least half of a rotation before the traction has been applied.

It is an object of the invention to provide a mechanical traction adjuster which will automatically and instantaneously apply additional traction to the drive wheels of a propelling vehicle when the implement being drawn through the field is subjected to a strain greater than the normal strain on the implement as it is moved through the soil, as well as a traction adjuster capable of being adjusted in proportion to the amount of strain required to actuate the same.

Another object of the invention is to provide a mechanical traction adjuster applicable to an earth-working machine for controlling the depth of penetration of the earth-working implements and which immediately and automatically will transfer the major portion of the weight of the equipment to the drive wheels of the propelling vehicle to afford additional traction and prevent spinning of such drive wheels when greater than normal resistance to movement is encountered.

A further object of the invention is to provide a mechanical traction adjuster of the character indicated which not only automatically will apply additional traction to the drive wheels of the propelling vehicle when additional resistance is encountered to the earth-working implements but a mechanical traction adjuster which automatically will reduce such additional traction when the excessive resistance has been overcome.

Figure 2:
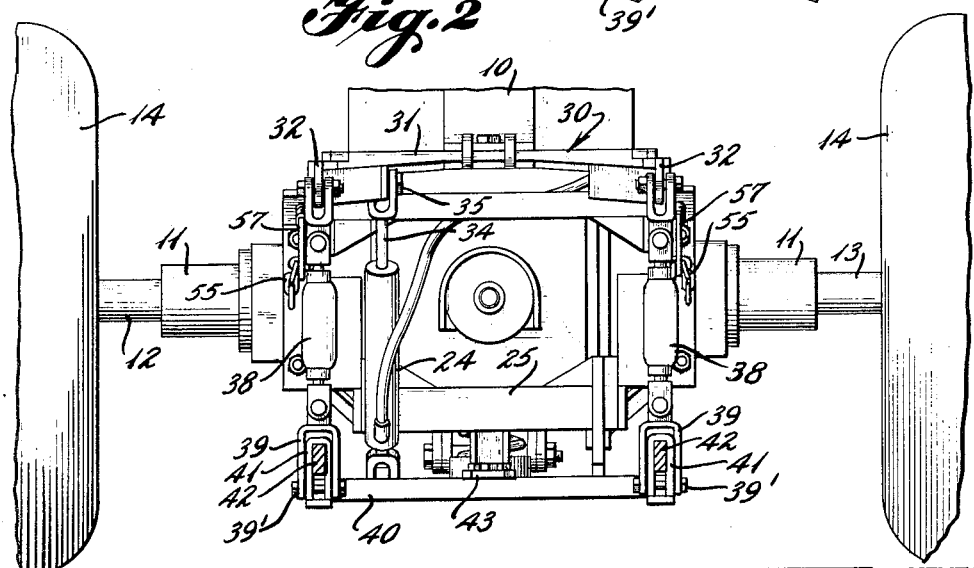
Figure 3:
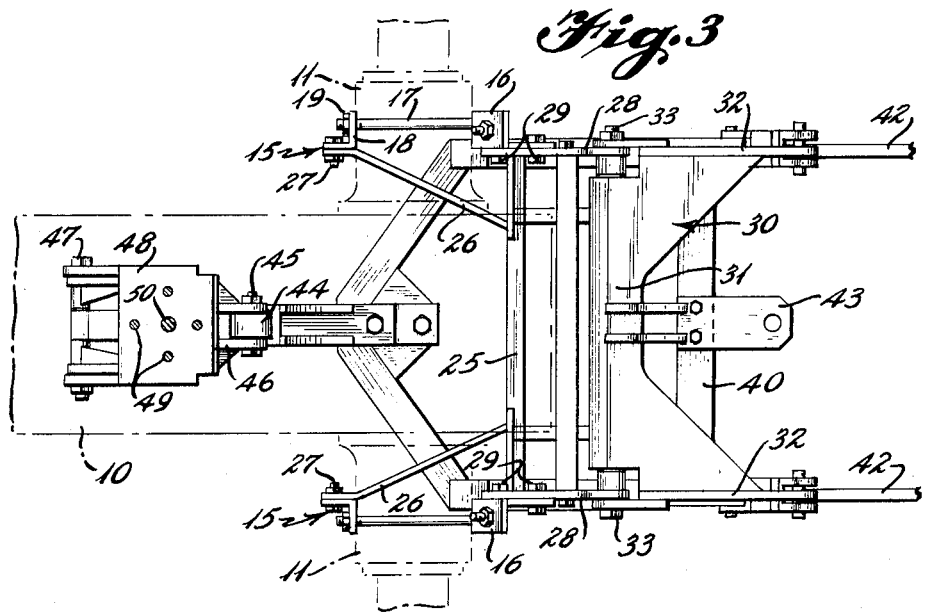
Figure 4:
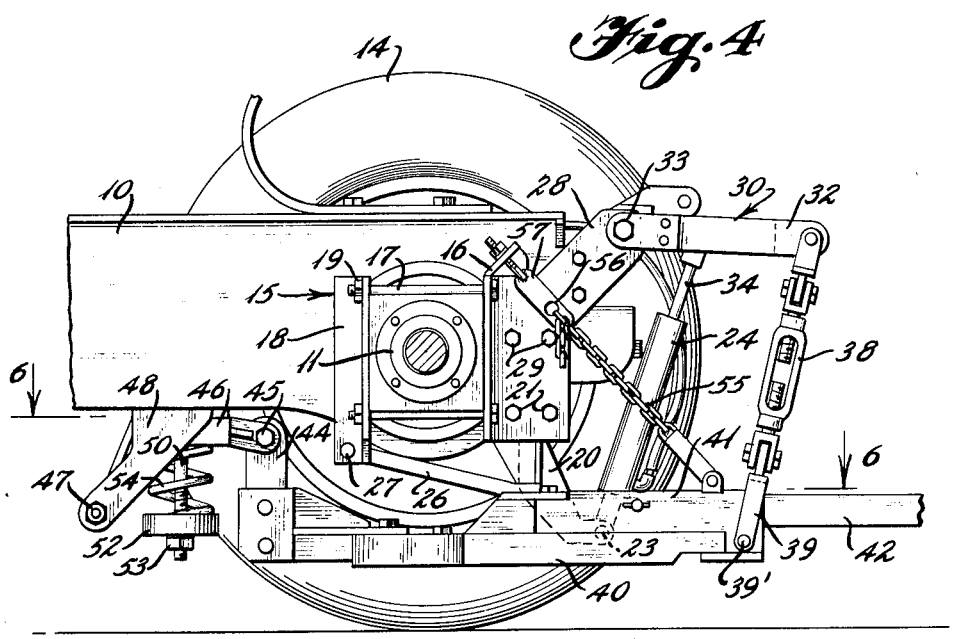

Other objects and advantages of the invention will be apparent from the following description taken in conjunction with the accompanying drawing in which:

FIG. 1 is a perspective illustrating one application of the invention as applied to a tractor;

FIG. 2, a rear elevation thereof;

FIG. 3, a top plan view of the invention per se with portions of the tractor being shown in phantom;

FIG. 4, a side elevation with the wheel of the tractor removed;

FIG. 5, a vertical section taken substantially along the longitudinal center line of the device;

FIG. 6, a section taken along the line 6—6 of FIG. 4;

FIG. 7, an enlarged front elevation of the connection to the tractor; and,

FIG. 8, a vertical section taken along the line 8—8 of FIG. 7.

Briefly stated the invention is a mechanical traction adjuster of a construction to be mounted on a tractor or other propelling vehicle for connection to an earth-working implement to be propelled in such a manner that the weight of the implement will be transferred to the drive wheels to apply additional traction thereto when the resistance encountered is greater than ordinary as the vehicle moves through the field, and which traction adjuster automatically will relieve the additional traction after the resistance returns to normal.

With continued reference to the drawings, the present invention is intended to be applied to a tractor 10 or other propelling vehicle having axle housings 11 in which are mounted right and left axle shafts 12 and 13 supported by wheels 14 all of conventional construction. A pair of clamps 15 are connected one to each of the axle housings 11 adjacent to the body of the tractor. Each of the clamps comprises an angle member 16 having one side in abutting relation with the axle housing and fixed thereto by bolts 17 located above and below the housing 11 and connected to an anchor plate 18. The bolts extend through openings in the anchor plate 18 and the angle member 16 and secure such plates in assembled relation by means of nuts 19. The other side of the angle member 16 is provided with a downwardly depending arm 20 connected at its upper end to the angle member 16 by rivets or bolts 21. The free end of the arm 20 has an opening 22 (FIG. 1) for the reception of a pivot pin 23 (FIG. 5) for connecting a hydraulic cylinder 24 to the arm 20. The downwardly depending arms 20 are connected by a crossrod 25 which in turn is supported by a brace 26 connected to the crossrod 25 and extending forwardly to the anchor plate 18 whereit is connected by means of fasteners 27 to form a rigid support for the downwardly depending arms 20.

An upwardly extending arm 28 is connected by rivets or other fasteners 29 to each of the angle members 16. A U-shaped member 30 having a bight portion 31 and a pair of arms 32 is provided and such bight portion is disposed between the free ends of the upwardly extending arms 28 and is pivotally connected thereto by pivot pins 33. The disposition of the U-shaped member 30 is adjustable about the pivot pins 33 by means of a piston rod 34 carried by the hydraulic cylinder 24, such piston rod being connected to at least one of the arms 32 by a pivot pin 35. Although only one hydraulic cylinder 24 and piston rod 34 is disclosed between the downwardly depending arm 20 and the U-shaped member 30, it is noted that a second cylinder and piston rod can be mounted on the other depending arm 20 and connected to the opposite side of the U-shaped member 30.

The free ends of the arms 32 are pivotally connected to an adjustable mechanical link means such as turnbuckles 38 and each of the turnbuckles is pivotally connected to a clevis 39 which in turn is pivotally connected by a pin 39' to a generally rectangular draft bar or frame 40. As illustrated the frame 40 may have a pair of sleeves 41 pivotally mounted at one end and adapted to receive implement connecting arms 42 utilizing a conventional two-point hitch. If desired a single-point hitch plate 43 is mounted on the frame 40 substantially in the center of the rear portion thereof. Also provision is made for a three-point hitch by providing lugs 30' on the U-shaped member 30 for the reception of a three-point connecting rod (not shown).

The forward portion of the frame 40 has an upstanding lug 44 which is pivotally connected by a pin 45 to one end of a bell crank bracket or lever 46. The opposite end of the bracket 46 is mounted on a hinge pin 47 carried by a U-shaped mounting bracket 48 connected by bolts or other fasteners 49 to the chassis of the tractor 10. The pin 45 is disposed above a straight line drawn between the pin 39' and the hinge pin 47 for a purpose which will be described later. A stud bolt 50 is secured to the mounting bracket 48 and the chassis of the tractor and such stud bolt extends downwardly through a slot 51 in the intermediate portion of the bell crank bracket 46. A cup member 52 is slidably mounted on the stud bolt 50 and is adjustable thereon by a nut 53. A spring 54 is disposed about the stud bolt 50 between the cup member 52 and the bell crank bracket 46 and the tension on such spring can be adjusted by means of the nut 53 for a purpose which will be described later.

If desired a pair of gauge chains 55 are provided with one of the chains being connected to each of the sleeves 41 or to the frame 40. The opposite end of each chain extends upwardly and is secured in a bayonet type opening 56 in a chain plate 57 adjustably mounted on the angle member 16.

When the device is ready to be operated the clamps 15 will be mounted on the axle housing 11 and hydraulic cylinder 24 on at least one of such clamps is connected to the U-shaped member 30. The frame 40 will be connected at the forward end to the bell crank bracket 46 and the turnbuckles 38 connected to the free ends of the arms 32 after which the implement will be connected to the sleeves 41 by means of the arms 32 and the opposite ends of the turnbuckles will be connected to the frame 40.

Upon actuation of the hydraulic cylinder 24 the implement may be raised and transported to the field. When the implement is in operating position, the piston rod 34 may be retracted within the hydraulic cylinder 24 to regulate the depth of penetration of the earth-working implement. If desired the gauge chains 55 may be operated to control the depth of penetration of the implement so that the use of the hydraulic system will not be required. As the implement is being drawn through the field by the tractor or propelling vehicle, the depth of penetration will be controlled from such tractor and most of the weight of the implement will be applied to the earth penetrating blades.

When the earth penetrating blades encounter portions of earth which are harder than usual the normal tendency is for the drive wheels to spin since additional strain is applied to the implement to resist forward motion of the vehicle. In the present application when the implement engages earth which is harder than usual, the implement has a tendency to stop and in so doing the forward portion of the frame 40 which is connected to the bell crank bracket 46 will move downwardly against the tension of the spring 54. Since the frame 40 is pivotally connected to the turnbuckles 38 by the pins 39', downward movement of the forward portion of the frame will rock such frame about the pins 39' and raise the rear portion thereof so that a substantial portion of the weight of the implement will be transferred up through the turnbuckles 38 and the U-shaped member 30 to the clamp 15 and thereby apply additional downward pressure on the axle housings 11 so that additional traction is applied to the drive wheels 12 to prevent spinning of such wheels. This transfer of weight is instantaneous and automatic so that the additional traction is applied to the wheels before the wheels have a chance to spin. Normally the additional traction applied is sufficient to allow the tractor to overcome the hard portions of earth through which the implement is passing. As soon as the implement has passed through the harder portions of earth, the spring 54 will move the bell crank bracket 46 back to its original position so that the weight of the implement is again applied to the earth penetrating blades. The tension on the spring 54 is easily adjusted by moving the nut 53 and cup member 52 up or down on the stud bolt 50 to any desired position.

It will be apparent that a relatively simple mechanical traction adjuster mechanism has been provided which will automatically and instantaneously apply additional traction to the drive wheels of a propelling vehicle when a greater strain than normal is applied to the earth penetrating blades of the implement and to automatically remove such additional traction when normal strain is returned.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A mechanical traction adjuster mechanism for attachment to a farm vehicle having an axle housing and drive wheels, comprising a pair of clamps for mounting on said axle housing, a downwardly depending arm mounted on each of said clamps, a hydraulic cylinder carried by at least one of said downwardly depending arms and having an upwardly extending piston rod, an upwardly extending arm fixed to each of said clamps, a U-shaped member pivotally connected to said upwardly extending arms, said piston rod being connected to said U-shaped member for controlling the position thereof, an implement mounting frame located below said U-shaped member, adjustable link means connecting said frame and said U-shaped member, a mounting bracket fixed to the chassis of said vehicle, a bell crank bracket hingedly carried by said mounting bracket, one end of said frame being pivotally connected to said bell crank bracket, bolt means extending downwardly from said mounting bracket through said bell crank bracket, cup means adjustably mounted on said bolt means, spring means disposed between said cup means and said bell crank bracket and normally urging said bell crank bracket to a raised position, and means for adjusting the tension on said spring means, whereby when additional stress is applied to the earth-working implement said bell crank bracket will be pivoted downwardly against the tension of said spring and will transfer the weight of the implement to said clamp to automatically and instantaneously apply additional traction to said drive wheels.

2. A mechanical traction adjuster mechanism for attachment to a farm vehicle having an axle housing and drive wheels, comprising a pair of clamps for mounting on said axle housing, a downwardly depending arm mounted on each of said clamps, a hydraulic cylinder carried by at least one of said downwardly depending arms and having an upwardly extending piston rod, an upwardly extending arm fixed to each of said clamps, a member pivotally connected to said upwardly extending arms, said piston rod being connected to said member for controlling the position thereof, an implement mounting frame located below said member, adjustable link means pivotally connecting said frame and said member, a mounting bracket fixed to the chassis of said vehicle, lever means connected to said mounting bracket by a hinge pin, one end of said frame being pivotally connected to said lever means above a line drawn between the pivot connecting the link means to the frame and said hinge pin, spring means carried by said mounting bracket and located below said lever means, said spring means normally urging said lever means to a raised position, and means for adjusting the tension on said spring means, whereby when additional stress is applied to the earth-working implement said lever means will be pivoted downwardly against the tension of said spring and will transfer the weight of the implement to said clamp through said adjustable link means to automatically and instantaneously apply addition traction to said drive wheels.

3. Apparatus for applying additional traction to the drive wheels of a vehicle when the forward movement of the vehicle is resisted comprising a frame fixed at one end to an earth-engaging implement, link means pivotally supporting said frame intermediate its ends from said vehicle, means for raising and lowering the frame supporting pivot of said link means to control the depth of penetration of the implement, lever means pivotally mounted at one end on said vehicle in spaced relation to said frame, the other end of said frame being pivotally connected to the opposite end of said lever means, the pivotal connection of the other end of said frame being located above a line drawn between said link means pivot and said lever means pivot and spring means adjustably supported by said vehicle below said lever means and engageable with said lever means intermediate the ends thereof for urging said lever means toward said vehicle, whereby when movement of the implement in a longitudinal direction is resisted said other end of said frame will move downwardly against the tension of said spring means and will rock said frame about said supporting pivot to transfer a substantial portion of the weight of the implement to the drive wheels of the vehicle.

4. A mechanical traction adjuster attachment for connecting an implement to a farm vehicle having a rear axle housing and drive wheels comprising clamp means removably connected to said axle housing, a frame disposed below said clamp means, a first pivot carried by said frame, link means connecting said first pivot to said clamp means, means for rigidly connecting an implement to said frame, a mounting bracket fixed to the vehicle, lever means connected to said mounting bracket by a second pivot, one end of said frame being connected to said lever means by a third pivot located between said first and second pivots, said third pivot being above a line drawn between said first and second pivots, and springs means supported by said mounting bracket below said lever means and engageable with said lever means for urging said lever means upwardly, whereby when a greater than normal strain is applied to the implement said lever means and said third pivot will rock downwardly about said second pivot and against the tension of said spring and will rock said frame about said first pivot to transfer the weight of the implement through said link means to the clamp means and automatically and instantaneously apply additional traction to the drive wheels of said vehicle.

References Cited by the Examiner

UNITED STATES PATENTS

| 1,363,777 | 12/1920 | Greenwood | 280—486 |
| 1,417,373 | 5/1922 | Geiger | 280—486 X |
| 2,751,835 | 6/1956 | Silver | 280—460 X |
| 3,024,850 | 3/1962 | Morkoski | 280—483 X |
| 3,031,208 | 4/1962 | Abbott | 280—460 |

FOREIGN PATENTS

| 627,972 | 9/1961 | Canada. |
| 740,112 | 11/1932 | France. |

OTHER REFERENCES 1,079,375, April 1960, German application 172–439.

ABRAHAM G. STONE, *Primary Examiner.*

F. B. HENRY, *Assistant Examiner.*